United States Patent [19]

Cumming

[11] Patent Number: 4,596,319
[45] Date of Patent: Jun. 24, 1986

[54] AUTOMATIC SLACK ADJUSTER FOR VEHICLE BRAKES

[76] Inventor: James C. Cumming, 25 Woodside Park, Pleasant Ridge, Mich. 48069

[21] Appl. No.: 551,350

[22] Filed: Nov. 14, 1983

[51] Int. Cl.$^4$ .............................................. F16D 65/56
[52] U.S. Cl. .......................... 188/79.5 K; 188/196 BA
[58] Field of Search .................. 188/79.5 GE, 79.5 K, 188/196 BA, 79.5 R, 79.5 GT

[56] References Cited

U.S. PATENT DOCUMENTS

| | | | |
|---|---|---|---|
| 3,990,546 | 11/1976 | Schultz | 188/79.5 K |
| 3,997,035 | 12/1976 | Zeidler | 188/196 BA |
| 3,997,036 | 12/1976 | Zeidler | 188/196 BA |
| 4,015,692 | 4/1977 | Mathews | 188/79.5 K |
| 4,019,612 | 4/1977 | Mathews et al. | 188/196 BA |
| 4,380,276 | 4/1983 | Sweet et al. | 188/196 BA |

FOREIGN PATENT DOCUMENTS 1152960  5/1969  United Kingdom ......... 188/196 BA

Primary Examiner—Bruce H. Stoner, Jr.
Assistant Examiner—Michael P. Gilday
Attorney, Agent, or Firm—Reising, Ethington, Barnard, Perry & Milton

[57] ABSTRACT

A slack adjuster for a cam actuated brake system is disclosed in which the change of angularity of the brake applying push rod relative to the actuating arm during brake application is used for sensing stroke length and effecting adjustment to compensate for brake wear. The adjusting mechanism comprises a pull rod and a gear rack coupled together by a lost motion connection. The lost motion distance corresponds with the normal stroke length of the brake applying push rod when the brake linings have the normal clearance. A pinion meshes with the gear rack and is coupled to an adjusting shaft through a one-way clutch. The adjusting shaft carries a worm which drives a worm gear to reposition the actuating shaft of the brake system to compensate for brake wear. When the brake is applied, any overtravel of the lost motion represents brake wear and the overtravel is memorized by the position of the gear rack. This movement of the gear rack causes the one-way clutch to overrun the shaft and the shaft is not rotated. When the brake is released, the gear rack is moved in the other direction an amount corresponding to the overtravel and the one-way clutch drives the adjusting shaft to reposition the actuating shaft to compensate for the brake wear.

15 Claims, 9 Drawing Figures

AUTOMATIC SLACK ADJUSTER FOR VEHICLE BRAKES

FIELD OF THE INVENTION

This invention relates to an automatic slack adjuster for vehicle brakes; more particularly, it relates to an adjuster which effects adjustment in response to brake operation.

BACKGROUND OF THE INVENTION

It is a common practice to provide the brake systems of commercial vehicles with automatic adjustment to compensate for brake lining wear. In cam actuated brake systems, both drum and disk types, an actuating shaft such as a camshaft, is repositioned relative to the brake actuating arm to position the brake shoe lining relative to the brake disk or drum surface. This establishes a desired clearance and the length of stroke required to move the brake shoes from the released position to the engaged position in which the brake lining is firmly seated against the disk or drum. Slack adjusters are known which automatically sense the wear of the brake lining and automatically adjust the camshaft to compensate for the wear in response to brake operation.

A slack adjuster of the aforementioned type is described in the Cumming et al U.S. Pat. No. 3,949,840. This patent discloses a slack adjuster which comprises an actuating arm having a worm gear rotatably mounted therein and a link pivotally connected thereto for connection with a brake applying push rod for pivoting the arm. The worm gear is mounted on the camshaft for rotation thereof to apply the brake when the actuating arm is pivoted. A shaft is rotatably mounted in the arm and has a worm thereon in driving engagement with the worm gear. A slack adjusting mechanism is connected between the link and the shaft and comprises a plunger assembly having an axially movable rotary driving connection with the shaft. A detent is resiliently biased into engagement with a helical thread with buttress teeth on the plunger. The plunger is moved outwardly during brake application and ratchets a number of teeth over the detent as a measure of the adjustment required. Upon release of the brakes, the plunger is moved inwardly and the detent causes rotation of the plunger and hence the worm and worm gear to adjust the camshaft.

The Oliver U.S. Pat. No. 3,507,369 discloses an automatic slack adjuster which employs a torque limiting, one-way drive mechanism to angularly adjust a camshaft relative to an actuating lever during brake application movement of the lever. The Lodjic et al U.S. Pat. No. 3,526,303 also describes a slack adjuster using a one-way clutch and which is operative upon brake application to adjust the camshaft.

The Sander et al U.S. Pat. No. Re. 26,965 describes a slack adjuster with a one-way clutch which is operative upon brake release movement of the actuating lever to effect adjustment of the camshaft. This adjuster employs an external cam and requires space for movement in a direction normal to the movement of the actuating rod.

Other automatic slack adjusters are disclosed in the following U.S. Pat. Nos.: to Bostwick, 3,121,478; to Bostwick, 3,307,661; to Bostwick, 3,618,715; to Svensson, 3,351,164; to Leber, 3,371,755; and to Schultz, 3,990,546.

The prior art slack adjusters are known to have one or more disadvantages. Certain adjusters attempt to sense the clearance between the brake lining and brake drum during brake application but these depend upon friction clutches and do not operate uniformly from cycle to cycle. Other adjusters attempt to sense the stroke length required for full brake application but accurate adjustment is not achieved because of backlash due to dimensional tolerances and because adjustment is made in finite increments. Certain slack adjusters are difficult to install due to their size and the space required. Other automatic adjusters have external operating parts such as cams and ratchets which may be impaired in operation by road dirt and other elements. Also, some of the prior art slack adjusters fail to facilitate manual adjustment of the camshaft upon initial installation in the vehicle and subsequent periodic maintenance.

A general object of this invention is to provide an improved automatic slack adjuster for vehicle brakes which overcomes certain disadvantages of the prior art.

SUMMARY OF THE INVENTION

This invention provides a slack adjuster which senses stroke length and produces an adjustment which is infinitely variable and unaffected by backlash due to dimensional tolerances. The slack adjuster of this invention is easy to install and facilitates manual adjustment upon initial installation and during subsequent periodic maintenance. Further, it is of small size and rugged construction with protection of the operating parts against the environment.

In accordance with this invention, a slack adjustment mechanism senses the amount of overtravel of the brake applying arm during brake application and makes an adjustment during brake release. This is accomplished by utilizing the change of angularity of the brake applying push rod relative to the actuating arm during brake application for positioning a gear rack and pinion to sense the length of stroke of the push rod. Lost motion, which corresponds with normal stroke length, is provided between a pull rod and the gear rack; any overtravel of the push rod causes an overtravel of the pull rod which displaces the gear rack and the pinion a distance corresponding to the amount of overtravel. The pinion is coupled to an adjusting shaft through a one-way clutch which overruns during the overtravel but which drivingly engages the shaft upon return travel. Upon brake release, the pull rod operates through the lost motion connection to drive the gear rack in the return direction the same distance as the overtravel. As a result, the pinion and adjusting shaft are angularly displaced an amount corresponding to the overtravel and the adjusting shaft, through a worm and worm gear, is effective to adjust the angular position of the brake actuating shaft for the next cycle of operation.

More particularly, the pull rod is coupled by the lost motion connection to the gear rack for displacing the gear rack and rotating the pinion when the pull rod overtravels the lost motion. The one-way clutch overruns the adjusting shaft during rotation of the pinion in the direction resulting from rotation by brake applying movement of the arm and drivingly engages the adjusting shaft during rotation of the pinion in the direction resulting from the brake releasing movement of the arm. The lost motion is established to correspond with the normal brake applying stroke of the push rod whereby any overtravel of the pull rod resulting from brake application corresponds to the required amount of stroke adjustment whereby the movement of the pull rod resulting from brake release causes the clutch to rotate the worm and thereby adjust the actuating shaft position.

Further, according to this invention, the lost motion connection comprises a platform mounted on the pull rod and a stem on the gear rack extends through an opening in the platform. Lost motion corresponding to the desired normal travel of the brake applying push rod is provided between a head at the free end of the stem and a shoulder on the stem. A removable shim may be installed between the platform and the head on the stem to establish the desired lost motion.

Further, according to this invention, the adjusting shaft is disposed transversely of the actuating arm with one end extending outside the arm and having a tool engaging head thereon for manual adjustment of the actuating shaft position. Preferably, the actuating arm has a transverse bore therein to accommodate the adjusting shaft and the pinion and one-way clutch are disposed coaxially of the shaft in a cavity in the arm. The gear rack is slideably disposed in another bore in the arm extending perpendicular to the adjusting shaft. The lost motion connection is disposed externally of the arm and a protective sleeve surrounding the lost motion connection is supported at one end of the pull rod and at the other end on said arm.

A more complete understanding of this invention may be obtained from the detailed description that follows given with the accompanying drawings.

BEST MODE FOR CARRYING OUT THE INVENTION

Figure 1:
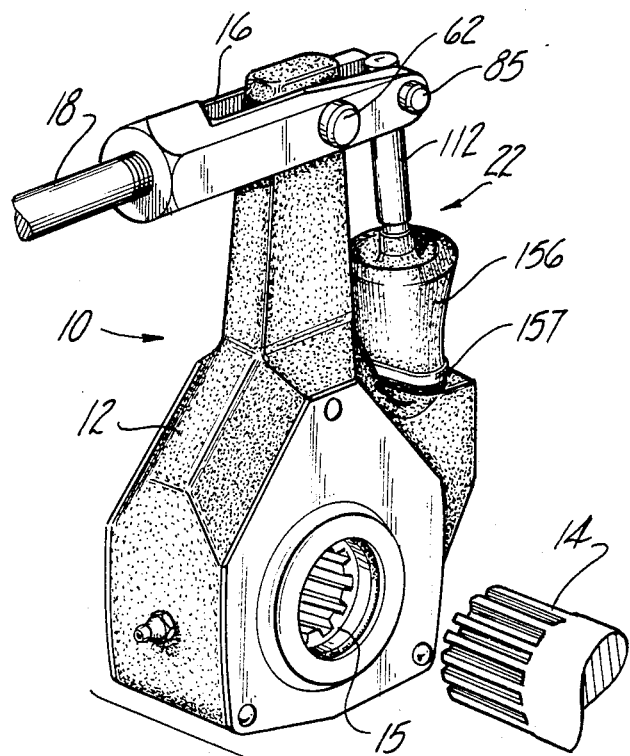
FIG. 1 is a perspective view of the slack adjuster of this invention.

Referring now to the drawings, there is shown an illustrative embodiment of the invention in a slack adjuster especially adapted for the use in a cam actuated brake system of the type used on large trucks. In particular, the illustrative embodiment is described in connection with a cam actuated drum brake system. It will be understood as the description proceeds that the invention is useful in other applications and embodiments.

FIG. 1 shows a perspective view of the slack adjuster 10 of this invention. It comprises, in general, an actuating arm 12 which is mounted at its lower end on a camshaft 14 of the brake system for applying torque thereto for application of the brake. A link or clevis 16 is pivotally connected with the upper end of the actuating arm and is adapted for connection with the push rod 18 of an actuating motor of the brake system. An adjusting mechanism 22 is connected between the free end of the clevis 16 and a worm gear 15 drivingly connected with the camshaft 14. The slack adjuster will be described in detail subsequently.

Figure 2:
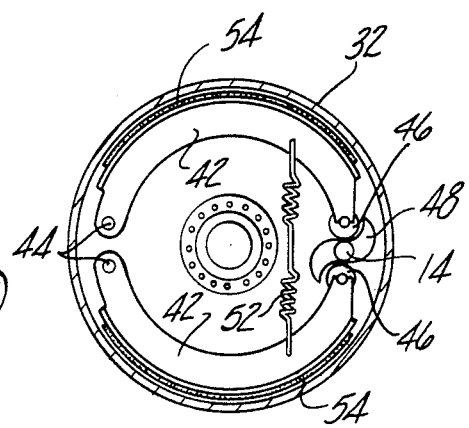
FIG. 2 shows a typical cam actuated drum brake.
Figure 3:
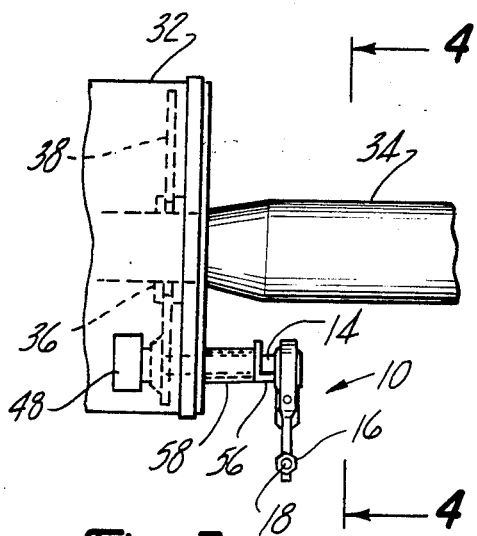
FIG. 3 is a plan view of a vehicle brake assembly including the slack adjuster.
Figure 4:
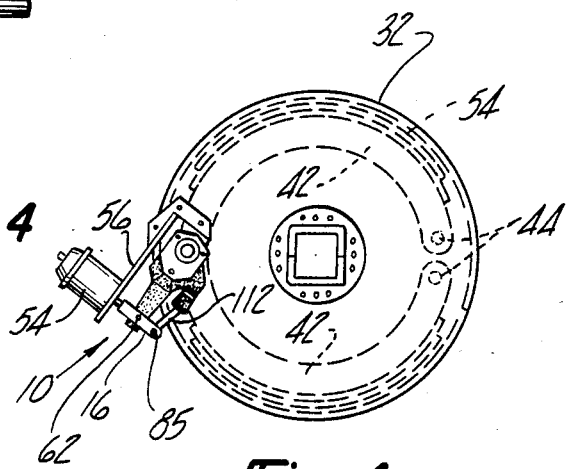
FIG. 4 is a view taken on lines 4—4 of FIG. 3.

FIGS. 2, 3 and 4 show a typical cam actuated brake assembly in which the slack adjuster of this invention is utilized. The brake assembly includes a brake drum 32 which is supported on the vehicle wheel. It also includes a flange 36 welded to the axle and a spider 38 secured to the flange. A pair of brake shoes 42 are respectively mounted for pivotal motion on the spider 38 by respective pins 44. The free end of each brake shoe 42 carries a roller follower 46. An S-shape brake actuating cam 48 is disposed between the followers 46 and is mounted on the camshaft 14 for rotation therewith. The brake shoes 42 are biased into engagement with the cam 48 by a tension spring 52 connected at its opposite ends to the respective brake shoes. Each of the brake shoes 42 is provided with a brake lining 54 adapted to engage the brake drum upon application of the brakes by rotation of the camshaft. An actuating motor 54, in the form of an air cylinder and piston, is provided for applying torque to the camshaft 14 to apply the brakes. For this purpose, the motor 54 is supported by a bracket 56 which in turn is mounted on a tube 58 which is attached to the spider 38 and surrounds the camshaft 14. The actuating motor 54 includes the push rod 18 connected to the piston of the motor. Upon application of the brakes, the motor is energized with fluid pressure and the piston displaces the push rod 18 and the clevis 16 and hence the actuating arm 12. This applies a torque through the worm gear 15 to the camshaft 14 and hence the cam 48 to apply the brakes. When the brake is released, the motor 54 is deenergized and a return spring in the motor causes a return stroke of the push rod 18 and hence a return motion of the actuating arm 12 and the cam 48 to release the brakes. With the brake released, the return spring of the motor 54 causes the piston thereof to seat against a stop member in a rest position.

When the actuating motor 54 is deenergized, the brake shoes 42 assume a rest position which is determined by the angular position of the cam 48. In this rest position, a normal clearance for the particular brake installation is provided between the brake linings 54 and the drum 32. When the brakes are applied, a normal stroke length of the push rod 18 is required to firmly press the brake linings against the brake drum to produce a desired braking effort. This normal stroke length of the push rod 18 includes an increment of motion to take up the clearance space between the linings and drum; it also includes an increment of motion to take up the tolerances in the mechanical connections, an increment of motion due to mechanical distortion of the brake elements including the drum and an increment of motion due to the heat expansion of the drum and brake lining. After the brake has been applied repeatedly, the brake linings 54 are progressively worn and become thinner and hence the clearance between the linings and the drum increases. Consequently, the length of stroke of the push rod 18 increases with wear of the brake lining and an increment of wear results in a corresponding increment of overtravel of the push rod, i.e. travel in excess of the normal travel.

In the brake installation including the slack adjuster, as described above, the push rod 18 is reciprocated by the motor 54 in operation of the brake. This causes the actuating arm 12 of the brake adjuster to rotate about the axis of the camshaft 14 which is in fixed position. Accordingly, this geometry causes the angular relationship between the clevis 16 and the actuating arm 12 to change in correspondence with the length of stroke of the push rod 18 from its rest position. This change of angularity between the clevis 16 and the actuating arm 12 is utilized by the slack adjusting mechanism 22 to adjust the rest position of the camshaft 14 to provide compensation for brake lining wear, in a manner which will be described presently.

Figure 5:
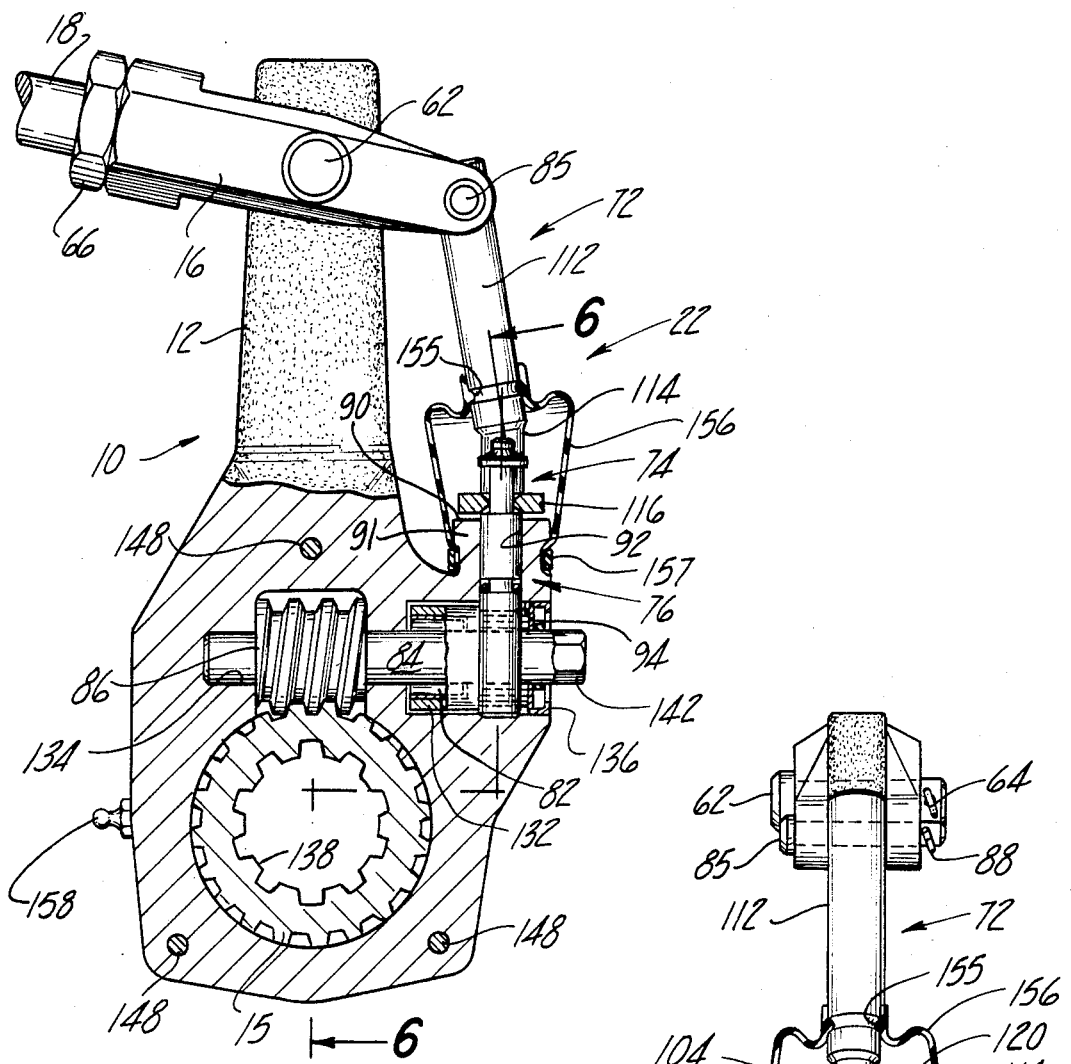
FIG. 5 is a side elevation view of the slack adjuster with the side cover plate removed.
Figure 6:
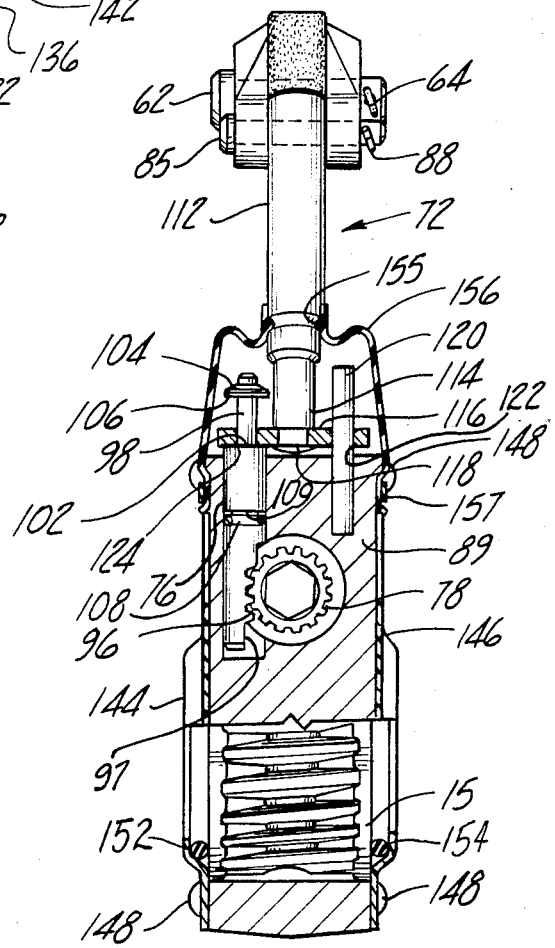
FIG. 6 is a view taken on lines 6—6 of FIG. 5.

Referring now to FIGS. 5 and 6, the slack adjuster 10 will be described in greater detail. The clevis 16 is pivotally connected to the actuating arm by a clevis pin 62 which is retained by a cotter pin 64. The push rod 18 is threadedly connected with the clevis 16 and retained by a jam nut 66.

The slack adjusting mechanism 22, as described above, is connected between the free end of the clevis 16 and the camshaft 14. This mechanism includes, in general, a pull rod 72 connected with the free end of the clevis 16 and connected through a lost motion connection 74 with a gear rack 76. The gear rack 76 is drivingly connected with a pinion 78 which is drivingly connected with a one-way clutch 82. The one-way clutch 82 is operatively coupled with an adjusting shaft 84 which carries a worm 86. The worm 86 meshes with the worm gear 15 which in turn is non-rotatably mounted on the camshaft 14.

The adjusting mechanism 22 will now be described in greater detail. The pull rod 72 is connected with the outer end of the clevis 16 by a pivot pin 85 which is retained by a cotter pin 88. The other end of the pull rod 72, as previously mentioned, is joined by the lost motion connection 74 with the gear rack 76. The actuating arm 12 comprises a body 89, preferably a metal casting, provided with a pedestal 91 having a flat surface 90. The gear rack 76 is slideably disposed in a bore 92 in the pedestal 91. The bore 92 extends axially of the actuating arm 12 into a cylindrical cavity 94 which extends transversely of the actuating arm 12. The gear rack 76 has gear teeth 96 which are exposed in the cavity 94 at one end of the gear rack. The other end of the gear rack 76 extends beyond the body of the arm 12 and includes a stem 98 extending from a shoulder 102 on the gear rack. The free end of the stem 98 has a head comprising a lock ring 104 of the push-nut type seated in a groove on the stem. A washer or shim 106 of the predetermined thickness is disposed on the stem 98 adjacent the lock ring 104. The gear rack 76 has a groove which retains a seal ring 108 for the purpose of excluding dirt and moisture from the cavity 94. An expanding ring 109 is also disposed in the groove and constitutes a friction detent to restrict undesirable motion of the gear rack 76 in relation to the body 89 of the actuating arm 12 during brake applications on rough roads.

The pull rod 72 has first and second straight sections 112 and 114 of unitary construction and which are joined at an oblique angle. The straight section 114 at its free end carries a platform 116. The platform 116 is supported on the pull rod section 114 by a neck portion which extends through the platform 116 and terminates in a peened head 118. A guide pin 120 is seated in the body 89 of the actuating arm 12 and extends axially through a hole 122 in one side of the platform 116. The stem 98 of the gear rack 76 extends axially through a hole 124 in the other side of the platform 116. The platform 116 is thick enough to provide the requisite strength and the holes 122 and 124 are provided with bevelled edges on both surfaces of the platform to avoid binding between the platform and the stem due to misalignment.

The lost motion connection 74 is comprised of the platform 116 coacting with the stem 98 between the shoulder 102 and the stop washer 106. In the lost motion connection, the lost motion distance is established by the spacing between the shoulder 102 and the washer 106. To change the lost motion distance for a particular installation, a washer 106 of different thickness can be used or additional washers can be added.

The pinion 78 is unitary with a coaxial clutch carrier 132 which is mounted on the adjusting shaft 84 by the one-way clutch 82. The shaft 84 is rotatably disposed in a transverse bore 134 which extends transversely of the actuating arm 12 from the bottom of the cavity 94. A shaft seal 136 is disposed around the shaft 84 and closes the cavity 94. The pinion 78 meshes with the gear teeth 96 of the gear rack 76 and is rotated thereby upon reciprocation of the gear rack. The one-way clutch 82 is an overrunning roller clutch, the body of which is press fitted into the carrier 132 with the rollers operatively coacting with the shaft 84. When the gear rack 76 is moved outwardly of the body 89 the clutch 82 overruns the shaft 84 and the shaft remains stationary. When the gear rack 76 is moved inwardly of the body 89 the clutch engages the shaft 84 and the shaft is rotated with the pinion 78.

The adjusting shaft 84 is coupled with the worm gear 15 through the worm 86. The worm gear 15 is rotatably mounted in the body 89 of the actuating arm 12. The worm gear is provided with an internal set of splines 138 which mesh with splines on the end of the camshaft 14. The rest position of the camshaft 14, and hence that of the cam 48, is established by the angular position of the worm gear 15. The worm 86 is mounted on the shaft 84 for rotation therewith and meshes with the worm gear 15. The adjusting shaft 84 is provided at its outer end with a tool receiving head 142 for manual adjustment of the angular position of the camshaft 14 and the cam 48, in a manner to be described subsequently.

The actuating arm 12 is provided with a pair of cover plates 144 and 146 on opposite faces thereof. The cover plates are held in position by drive rivets 148. A pair of annular seals 152 and 154 are disposed within the cover plates 144 and 146, respectively, around the opening which accommodates the camshaft 14 and provide a seal between the respective cover plate and the worm gear 15 to exclude dirt and moisture. An enclosure sleeve or boot 156 is disposed between the pull rod 72 and the pedestal 91 on the body 89 of the actuating arm 12 to exclude dirt and moisture from the mechanism. The boot is made of elastomeric material and has an annular bead 155 disposed in a groove on the pull rod 72; it is secured to the pedestal 91 by a band 157. A lubrication fitting 158 is provided on the body 89 of the arm 12 and communicates with the worm gear 15 for lubrication thereof as required.

Figure 7:
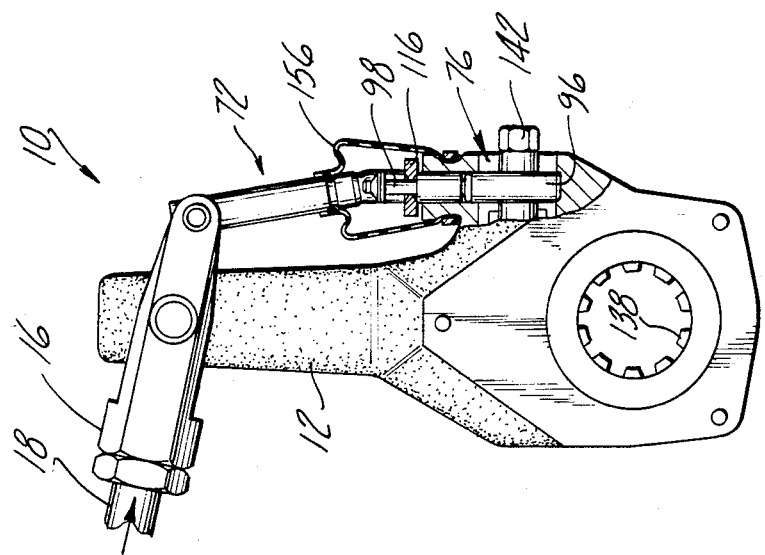
FIG. 7 shows the slack adjuster with the brake in the rest position.

The operation of the slack adjuster will now be described with particular reference to FIGS. 7, 8 and 9. FIG. 7 shows the slack adjuster in its rest position, i.e. the brake is not applied and the actuating motor is not energized and thus the push rod 18 is in its rest position. In this condition, the clevis 16 has a predetermined angular relationship with the arm 12 and the pull rod 72 is in a position in which the platform 116 is seated against the shoulder 102 on the gear rack 76. (See also FIG. 6.) With the pull rod 72 in this position, the gear rack 76 is in its full downward position so that the pinion 78 and clutch 82 and hence the worm gear 15 are in a predetermined rest position. This positions the camshaft 14 and the cam 48 in a corresponding rest position. For explanatory purposes, it will be assumed that a desired clearance exists between the brake shoe linings 54 and the brake drum 32. Also, the lost motion distance of the lost motion connector 74 is a distance corresponding to the stroke length of the push rod 18 which is necessary to firmly press the brake shoe linings against the brake drum to apply the brakes. This is the normal stroke of the push rod 18 and includes the take-up of the clearance, the dimensional tolerances, the distortion of the brake elements and the heat expansion of the brake drum and linings.

Figure 8:
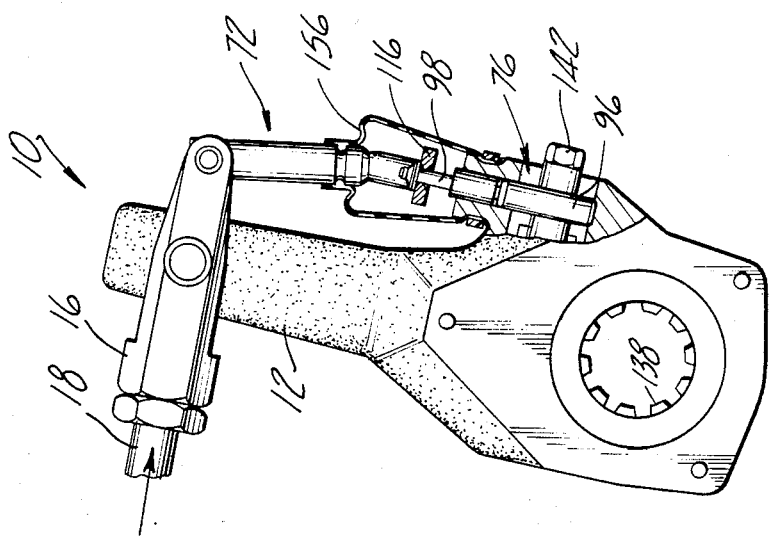
FIG. 8 shows the slack adjuster with the brake applied with a normal stroke.

FIG. 8 depicts the slack adjuster with the brake applied with a moderate or normal braking pressure and duration before there is any significant wear of the brake linings 54, i.e. there is normal clearance between the linings and the brake drum as described above. In this condition, the angular relation of the clevis 16 and the arm 12 is changed so that the pull rod 72 lifts the platform 116 away from the shoulder 102 until it just reaches the washer 106 without lifting the gear rack 76. Thus, for the normal clearance between the brake lining 54 and the brake drum 32, the lost motion of the lost motion connector 74 just accommodates the normal stroke of the push rod 18. When the brake is released, the return spring of the actuating motor 54 causes the clevis 16 and the arm 12 to return to the angular relationship as shown in FIG. 7.

Figure 9:
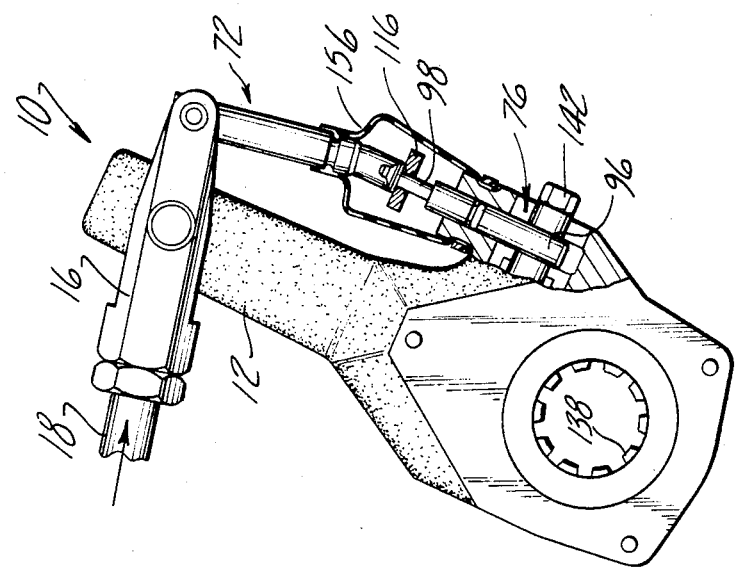
FIG. 9 shows the slack adjuster with the brake applied in a stroke with overtravel due to brake lining wear.

FIG. 9 depicts the slack adjuster in the position it assumes when the brakes are applied under one or more of the following conditions: (1) brake linings 54 are worn so that the clearance from the brake drum 32 is greater than normal (2) abnormally high braking pressure which causes significant distortion of the brake elements, and (3) abnormally long duration which causes significant heat expansion of the drum. Under any combination of such conditions, an overtravel of the stroke length of the push rod 18 beyond the normal stroke length is required to apply the brakes. Thus, the arm 12 is moved to a more acute angular relationship with the clevis 16 and the pull rod 72 is lifted to a greater extent when the brakes are applied. This causes the platform 116 to overtravel the lost motion distance of the lost motion connector 74 so that the platform 116 engages the washer 106 before the end of the stroke and lifts the gear rack 76 relative to the pinion 78. Thus, the pinion is rotated an amount corresponding to the overtravel in the stroke length of the push rod 18. This movement of the gear rack 76 and consequent rotation of the pinion 78 causes the one-way clutch 82 to overrun the adjusting shaft 84 and hence there is no rotation of the shaft during brake application. However, when the brake is released, the return spring in the actuating motor 54 retracts the push rod 18 to the position shown in FIG. 7. This retraction causes the platform 116 to move downwardly against the shoulder 102 on the gear rack 76 and the gear rack is moved downwardly relative to the pinion 78 by a distance corresponding to the overtravel of the push rod 18 during brake application. This downward motion of the gear rack 76 causes rotation of the pinion an amount corresponding to the overtravel. Rotation of the pinion in this direction causes engagement of the one-way clutch 82 with the adjusting shaft 84; accordingly, the shaft 84, worm 86 and worm gear 15 are rotated an amount corresponding to the overtravel of the push rod 18 in its brake applying stroke. This rotation of the worm gear 15 is imparted to the camshaft 14 and the cam 48 to reset the rest position of the cam to provide a degree of compensation for the wear of the brake lining. Thus, the adjusting mechanism 22 is effective, upon each brake application, to sense the stroke of the push rod 18 and to memorize the exact amount of overtravel. Upon release of the brakes, the adjusting mechanism 22 is effective to reposition the cam 48 in accordance with any overtravel sensed during brake application. Because of the drive ratio in the adjusting mechanism 22, the rotation of the camshaft 14 in the typical cycle of adjustment is less than that required for full compensation for the brake lining wear. Typically a number of brake application cycles may be required to restore the clearance between the brake linings and drum to the normal clearance.

A further feature of operation of the slack adjuster of this invention permits manual rotation of the camshaft 14 by means of the tool receiving adjusting head 142 for periodic maintenance of the brakes, such as relining. For this purpose, the pivot pin 85 is removed to disconnect the pull rod 72 from the clevis 16. The adjusting shaft 84 is rotated manually in the direction (clockwise as viewed in FIG. 6) required to increase the clearance between the brake lining 54 and the drum 32. Rotation of the shaft 84 in this direction causes the one-way clutch 82 to rotate the pinion 78 and the gear rack 76 is moved upwardly until the teeth on the pinion 78 no longer mesh with the gear teeth on the gear rack; instead, the pinion teeth are opposite the flat 97 on the lower end of the gear rack. Thus, the shaft 84 can be rotated to the desired extent with the pinion idling until there is enough clearance between the brake linings 54 and the drum 32 to permit removal of the wheel and brake drum assembly. After the brake shoes are provided with new linings, the wheel and drum assembly is reinstalled. The desired clearance is established by pushing the gear rack 76 into the body 89 followed by rotation of the adjusting shaft 84. During rotation of the shaft 84 in the counterclockwise direction (as viewed in FIG. 6), the one-way clutch 82 is overrunning and the pinion 78 is not rotated. After the desired clearance is achieved between the new brake linings and the brake drum by rotation of the adjusting shaft 84, the pull rod 72 is reconnected with the clevis 16 by means of the pivot pin 85.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In a brake actuator and slack adjuster of the type comprising an actuating arm having a worm gear rotatably mounted adjacent one end and a link pivotally connected to the arm adjacent the other end and adapted for connection with a brake applying push rod for pivoting the arm, the worm gear being adapted to be mounted on an actuating shaft for rotation thereof to apply the brake when the actuating arm is pivoted, the angularity of the link relative to the arm being changeable with the movement of the push rod, a transverse shaft rotatably mounted in the arm and having a worm thereon in driving engagement with the worm gear and a slack adjusting mechanism connected between the link and the transverse shaft, the improvement wherein said adjusting mechanism comprises:
- a pinion coupled to said transverse shaft by a one-way clutch,
- a gear rack in engagement with said pinion,
- a pull rod pivotally coupled with said link,
- a lost motion connection between said pull rod and said gear rack for displacing said gear rack and rotating said pinion when the pull rod overtravels the lost motion of the lost motion connection,
- said lost motion connection having a lost motion corresponding to the normal brake applying stroke of the push rod and being fully retracted without overtravel of the lost motion when the gear rack is positioned for the desired running clearance with the brake released and being fully extended without overtravel of the lost motion when the gear rack is positioned for the desired running clearance with the brake applied,
- means including a one-way clutch for effectively disconnecting said pinion from said shaft when said pinion is rotated in the direction corresponding to brake applying movement of said arm and for effectively connecting said pinion to said shaft for rotating said shaft an amount corresponding to the rotation of said pinion throughout its rotation resulting from brake releasing movement of said arm,
- whereby any overtravel of the pull rod resulting from brake application corresponds to the desired amount of stroke adjustment and whereby the movement of the pull rod resulting from brake release causes the clutch to rotate the worm and thereby adjust the actuating shaft position for a brake applying stroke.

2. The invention as defined in claim 1 wherein said lost motion connection comprises,
- a platform mounted on said pull rod and having an opening therein,
- a stem on said gear rack extending through said opening and terminating in a head at the free end and at a shoulder at the other end whereby the platform is freely movable between said shoulder and said head to provide lost motion.

3. The invention as defined in claim 2 including a removable shim between said platform and said head whereby the lost motion may be changed in accordance with the desired normal brake applying stroke.

4. The invention as defined in claim 2 including means coupled between said gear rack and said actuating arm for constraining said gear rack against movement in response to shock and vibration of said arm.

5. The invention as defined in claim 4 wherein said means comprises an expansion ring disposed in a groove in said gear rack.

6. The invention as defined in claim 2 wherein said platform has a second opening therein,
- said pull rod being connected with said platform between said openings,
- and a guide rod extending through said second opening and fixedly mounted in said arm.

7. The invention as defined in claim 1 wherein said transverse shaft extends outside said arm and has a tool engaging head thereon for manual adjustment of the camshaft position.

8. The invention as defined in claim 2 wherein, said actuating arm has a transverse bore therein, said transverse shaft being disposed in said bore,
- said arm defining a cavity adjacent one end of the transverse bore, said pinion and one-way clutch being disposed coaxially of said transverse shaft in said cavity,
- a second bore in said arm extending perpendicular to said transverse shaft, said gear rack being slideably disposed in said second bore,
- said lost motion connection being disposed externally of said arm.

9. The invention as defined in claim 6 wherein said transverse shaft has one end extending outside said actuating arm, a tool engaging head on said one end for manual adjustment of said camshaft.

10. The invention as defined in claim 6 including a protective sleeve surrounding said lost motion connection and supported at one end on said pull rod and at the other end on said arm.

11. The invention as defined in claim 10 including a seal ring coacting between said gear rack and said arm to exclude dirt and moisture from said pinion and said one-way clutch.

12. The invention as defined in claim 9 including a first seal coacting between said gear rack and said arm and a second seal disposed in said cavity and coacting between said adjusting shaft in said arm for excluding dirt and moisture from said pinion and said one-way clutch.

13. The invention as defined in claim 6 wherein said pull rod has one end section pivotally connected with said link and has another end section rigidly connected with said platform, said end sections being unitary with one end section extending obliquely of the other end section.

14. The invention as defined in claim 2 wherein said platform has a bevelled edge surrounding said opening.

15. The invention as defined in claim 13 wherein said platform has a bevelled edge surrounding said opening.

* * * * *